United States Patent
Kawai (10) Patent No.: US 7,199,781 B2
(45) Date of Patent: *Apr. 3, 2007

(54) METHOD OF PRODUCING DISPLAY PANEL AND DISPLAY PANEL

(75) Inventor: Hideyuki Kawai, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 482 days.

This patent is subject to a terminal disclaimer.

(21) Appl. No.: 10/434,240

(22) Filed: May 9, 2003

(65) Prior Publication Data

US 2003/0193473 A1    Oct. 16, 2003

Related U.S. Application Data

(62) Division of application No. 09/673,372, filed as application No. PCT/JP00/00976 on Feb. 21, 2000, now Pat. No. 6,583,780.

(30) Foreign Application Priority Data

Feb. 19, 1999 (JP) ................................. 11-041637

(51) Int. Cl.
    *G09G 3/34* (2006.01)
(52) U.S. Cl. ....................... 345/107; 359/296
(58) Field of Classification Search ................ 345/107, 345/87; 359/296, 290; 204/606, 450
    See application file for complete search history.

(56) References Cited

U.S. PATENT DOCUMENTS

| 5,559,615 | A |   | 9/1996  | Takei et al. |
| 5,961,804 | A | * | 10/1999 | Jacobson et al. .......... 204/606 |
| 6,045,955 | A | * | 4/2000  | Vincent ..................... 430/45 |
| 6,067,185 | A |   | 5/2000  | Albert et al. |
| 6,172,798 | B1| * | 1/2001  | Albert et al. ............... 359/296 |
| 6,400,492 | B1|   | 6/2002  | Morita et al. |
| 6,459,418 | B1| * | 10/2002 | Comiskey et al. .......... 345/107 |
| 6,583,780 | B1| * | 6/2003  | Kawai ........................ 345/107 |
| 6,738,050 | B2| * | 5/2004  | Comiskey et al. .......... 345/173 |

FOREIGN PATENT DOCUMENTS

| EP | 647870     | 4/1995 |
| JP | 7-104257   | 4/1995 |
| JP | 7-110465   | 4/1995 |
| JP | 7-110466   | 4/1995 |
| JP | 8-179284   | 7/1996 |
| JP | 9-160511   | 6/1997 |
| JP | 2000-98597 | 4/2000 |

* cited by examiner

*Primary Examiner*—Regina Liang
(74) *Attorney, Agent, or Firm*—Oliff & Berridge, PLC (57) ABSTRACT

The prevent invention is a method in which microcapsules are placed at desired locations selectively accurately and easily to produce a high accuracy electrophoretic display panel. In the production method of a display panel of the present invention, the microcapsules (43) are uniformly coated onto a substrate (41), on which electrodes (42) is formed by using an optical hardening resin as a binder material (44). Next, the binder material (44) is hardened by selectively irradiating a light beam to the only locations desired for placing the microcapsules (43) by using a photomask (45). The binder material (44) of portions not hardened is removed by washing in water. Thus, the microcapsules can be selectively and accurately placed at the only desired positions. A color electrophoretic display panel, in which each microcapsule of three primary colors is placed in a predetermined arrangement, can be produced by sequentially performing the processes for the three types of microcapsules corresponding to three primary colors.

6 Claims, 5 Drawing Sheets

METHOD OF PRODUCING DISPLAY PANEL AND DISPLAY PANEL

This application is a Continuation of prior pending application Ser. No. 09/673,372, filed Oct. 16, 2000 which is a U.S. National Stage of PCT/JP00/00976 filed Feb. 21, 2000, the contents of which are incorporated herein by reference.

TECHNICAL FIELD

The present invention relates to a display panel using microcapsules which accommodates an electrophoretic or magnetophoretic particles, and more particularly, to a method of producing the display panel capable of arranging the microcapsules at a predetermined position on electrodes accurately and the display panel in which the microcapsules is accurately, arranged at the predetermined position on the electrodes.

BACKGROUND ART

In an electrophoretic display apparatus and magnetophoretic display apparatus for displaying a desired picture by using the microcapsules, each sealing colored dispersion media and the electrophoretic particles, the uniform arrangement of the microcapsules over a substrate is important on a stable display operation.

Conventionally, many methods with an object of producing a pressure sensing paper and a heat sensitive paper are proposed an methods of uniformly coating microcapsules on a plane surface.

For instance, the Japanese Patent No. 1545227 discloses a method of producing a pressure sensing copying paper by a free fall vertical curtain method as a preferable method than an air knife or blade coating method.

Also, the Japanese Patent No. 1376224 discloses a hopper typed coating apparatus as a similar method.

Further, the Japanese unexamined patent publication No. 57-27172 discloses a method to spray microcapsules coating liquid to a web (a support body) which runs continuously and to obtain a coating layer of continuous constant thickness by leveling this with a leveling device.

Moreover, the Japanese unexamined patent publication No. 62-138284 discloses a method in which a bonding layer is formed over a substrate, microcapsules layer is formed thereon, and the non-contacted microcapsules with the bonding layer are separated by gravity to form an uniform microcapsules layer of a single layer.

However, the aforementioned methods are for the purpose of obtaining the uniform layer of microcapsules, and are not sufficient methods for forming the microcapsules layer used in the display panel.

Properly placing the microcapsules at positions corresponding to electrodes or magnetic poles, configuring a display pixel in the display panel, is important to display a high definition image with uniform for each pixel. The display panel must form a uniform microcapsules layer and also control an arrangement place of each microcapsules.

Particularly, when trying to display in colors, it is necessary to place a number of microcapsules of different display colors for each pixel and control each individually. To carry out such control, the microcapsules of each display color has to be placed selectively, accurately, and with high precision, the arrangement of the microcapsules must be carried out at a higher precision.

At this point, a method of placing the microcapsules at a desired position selectively and accurately is not proposed in any method as aforementioned, and no such method exists except herein.

DISCLOSURE OF THE INVENTION

An object of the present invention is to provide a method of producing display panel using electrophoretic or magnetophoretic phenomenon, capable of placing microcapsules at the desired positions selectively and accurately.

Another object of the present invention is to provide a method of producing a display panel by using electrophoretic or magnetophoretic phenomenon, capable of high definition display or full color display by placing microcapsules at the desired position selectively and accurately.

Still, another object of the present invention in to provide a display panel using electrophoretic or magnetophoretic phenomenon, in which microcapsules are selectively and accurately placed at the desired positions.

Therefore, a method of producing a display panel according to the present invention, in which microcapsules each sealing dispersion media of each colored to a predetermined color and electrophoretic or magnetophoretic particles are placed over a substrate, and the desired image is displayed by changing a representation color of the microcapsules by applying an electric field or magnetic field to each microcapsules, comprises: a step of coating the microcapsules, each sealing dispersion media of each colored to a predetermined color and an electrophoretic particle or magnetophoretic particle, onto a substrate by using an optical hardening resin as a binder material; a step of fixing the microcapsules at the desired areas onto the substrate on which the microcapsules are arranged by irradiating light beam on the areas to harden the binder material and to fix the microcapsules over the substrata, and; a step of removing the non-use microcapsules and the binder material except for the hardened binder material and microcapsules fixed onto the substrate.

Preferably, electrodes poles or magnetic poles by which an electric filed or magnetic field is applied to the microcapsules are provided over the substrate, in the step of fixing the microcapsules onto the substrate, the light beam is selectively irradiated to the areas corresponding to the electrodes or magnetic poles over the substrate to fix the microcapsules to every area corresponding to the electrodes or magnetic poles provided over the substrate.

Further, in the stop of the microcapsules fixed over the substrate, the light beam is selectively irradiated at the desired areas by using a photomask.

Specifically, the processes is the steps are sequentially performed on the three types of microcapsules in which the electrophoretic particles or magnetophoretic particles each colored by one of three primary colors, and the dispersion media each colored by a color different to the three primary colors are sealed, and the three types of microcapsules being classified by the colors of the dispersion media, to arrange the three types of microcapsules over the substrate in a predetermined arrangement, to thereby produce the display panel able to display color images.

Further, the processes is the steps are sequentially performed on the three types of microcapsules in which the dispersion media each colored by one of three primary colors, and the electrophoretic particles or magnetophoretic particles each colored by a color different to the three primary colors are sealed, and the three types of microcapsules being classified by the colors of the electrophoretic particles or magnetophoretic particles, to arrange the three types of microcapsules over the substrate in a predetermined arrangement, to thereby produce the display panel able to display color images.

Further, the display panel, according to the present invention, in which microcapsules each sealing dispersion media of each colored to a predetermined color, and electrophoretic particles or magnetophoretic particles, are placed over a substrate, and a display is performed by applying an electric or magnetic field to each microcapsule, to change a presentation color of the microcapsule comprising: a pair of substrates, at least one being a transparent substrate; a plurality of microcapsules placed and fixed between the pair of substrates by an optical hardening resin binder; and electrodes or magnetic poles, provided over the substrate, for applying an electric or magnetic field to the microcapsules.

BRIEF DESCRIPTION OF THE DRAWINGS

Objects and features of the present invention as mentioned above becomes more clear from the following descriptions referring to the attached drawings, FIG. 1A to FIG. 1C are diagrams for explaining a production method of a display panel of a first embodiment in the present invention;

FIG. 2A and FIG. 2B are diagrams showing a structure of a display panel of a second embodiment in the present invention;

FIG. 3A to FIG. 3C are diagrams showing structures of three types of microcapsules;

FIG. 4A to FIG. 4B are diagrams showing states at the time that an electric field is applied to the microcapsules including dispersion media of magenta (M) shown in FIG. 3A from outside;

FIG. 5 is a diagram for explaining a production method of a display panel of a second embodiment in the present invention;

BEST MODE FOR CARRYING OUT OF THE INVENTION

First Embodiment

First, a method which is a basic production method of the display panel for the present invention and a method for placing the microcapsules at any positions over a substrate selectively and accurately will be explained referring to FIGS. 1A to 1C as a first embodiment of the present invention.

Figure 1A:
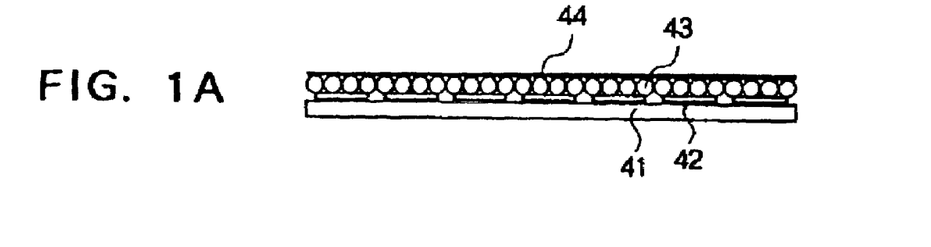
FIG. 1A is a diagram showing a state of coating the microcapsules onto a substrate.
Figure 1B:
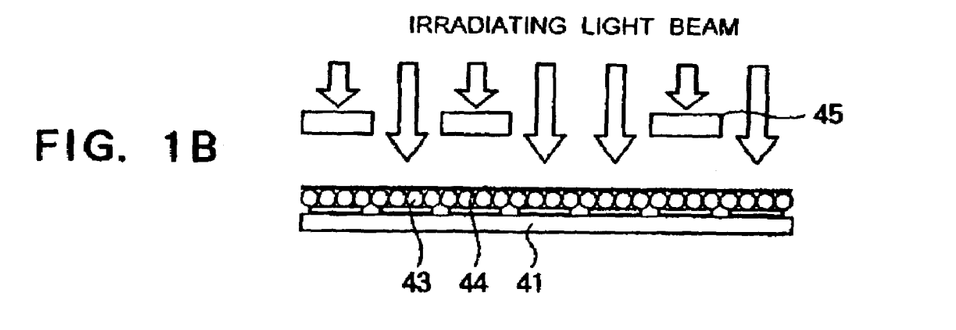
FIG. 1B is a diagram showing an irradiating of a light beam at the desired locations to be placed the microcapsules.
Figure 1C:
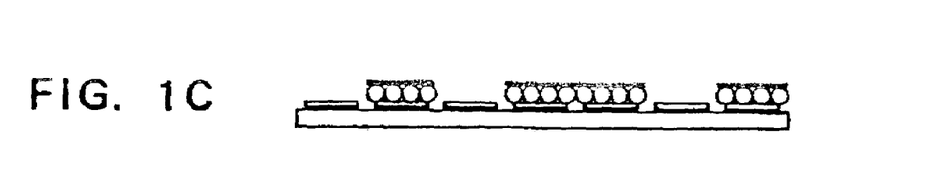
FIG. 1C is a diagram showing the removal of the microcapsules coated from a portion where the microcapsules should not be coated, by washing in water.

FIGS. 1A to 1C are diagrams showing a step of placing the microcapsules at the desired position over a substrate.

At first, as shown in FIG. 1A, microcapsules 43 are uniformly coated over a substrate 41 on which electrode 42 are formed by using an optical hardening resin as a binder material 44.

Next, as shown in FIG. 1B, the binder material 44 is hardened by selectively irradiating light beam at the only portions desired to place the microcapsules 43 over the substrate 41 by using a photomask 45.

And the binder material 44 on a portion not hardened is removed by washing in water.

As a result, the microcapsules can be selectively and accurately placed at the only desired positions as shown in FIG. 1C.

In this way, in the production method, the microcapsules can be placed at the desired portions by only irradiating the light beam. Therefore, for instance, in a step of coating the microcapsules over the substrate 41, a special high accuracy position control is not necessary, and the microcapsules can be selectively, accurately and easily placed at the desired positions.

Second Embodiment

Next, the production method of the electrophoretic display panel being capable of the full color display for each pixel will be explained referring to FIGS. 2A to 5D as a second embodiment.

First, a structure of the display panel is explained.

Figure 2A:
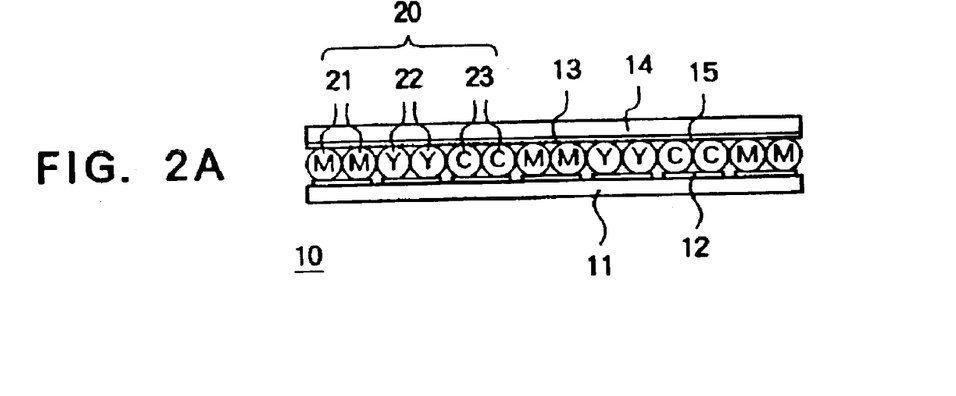
FIG. 2A is a sectional view showing a structure of the display panel.
Figure 2B:
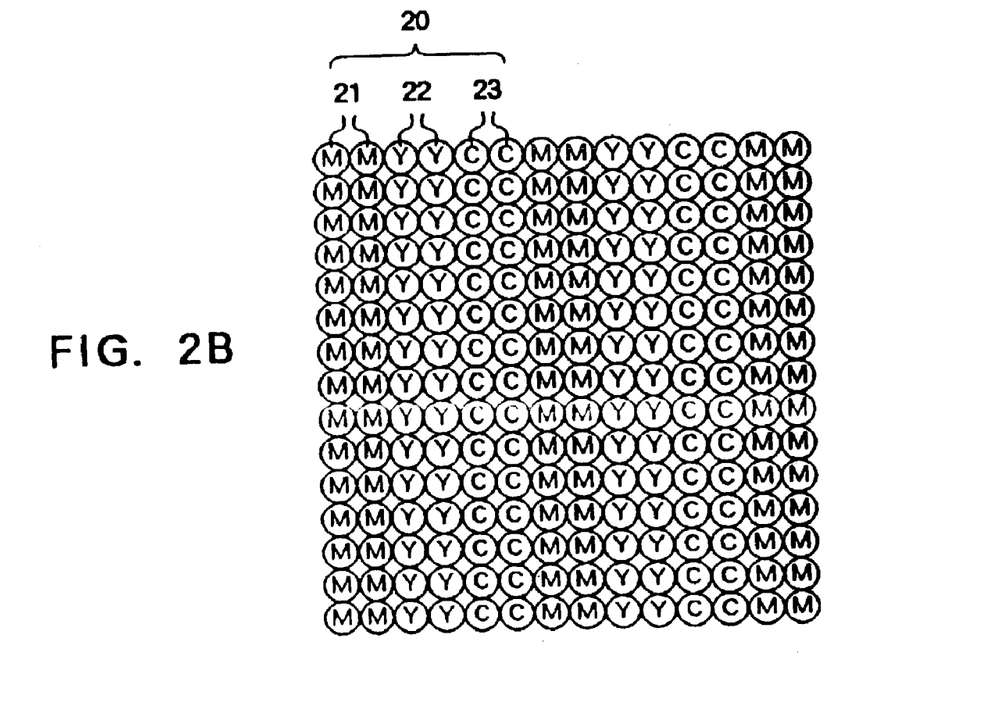
FIG. 2B is an upper view of the display panel showing an arrangement of the microcapsules.

FIGS. 2A to 2B show structures of the display panel, FIG. 2A is a sectional view showing the structure of the display panel, and FIG. 2B is an upper view of the display panel showing an arrangement of the microcapsules.

As shown in FIG. 2A, the structure of a display panel 10 of the present embodiment has a structure in which a lower substrate 11 on which a first electrode 12 is formed and an upper substrate 14 on which a second electrode 13 is formed are placed so as to face the electrodes and three types of microcapsules 21, 22, and 23 in which the dispersion media of each colored to magenta (M), yellow (Y), and cyan (C) are placed in a predetermined arrangement therebetween.

Note that the second electrode 13 and the upper substrate 14 side in the display panel 10 are a display surface the three types of microcapsules 21(M), 22(Y), and 23(C) are in two dimensional arrangement, orderly placed in a column direction and row direction, and are a stripe arrangement such that each two rows of the same color are sequentially repeated in the column direction continuously and the same color in continued in the row direction as shown in FIG. 2B. The three types of microcapsules 21(M), 22(Y), and 23(C) are placed on the lower substrate 11.

The lower substrate 11 is a substrate which is configured by any insulation members supporting the display panel 10.

The first electrode 12, as shown in FIG. 2B, is a divisional electrode formed so as to be individually applicable a desired electric field to each of a set of microcapsules of each two microcapsules with: the same color which is continuously placed in the column direction, and is formed over the lower substrate 11. A switch element in the first electrode 12 of the display panel 10 in the present embodiment is provided for each electrode corresponding to each set of microcapsules, thereby a selection signal is applied for each column from a not shown matrix driving circuit. Further a control signal and outputs from a driving transistor are applied to each row, and the desired electric field is applied to a desired set of microcapsules.

A charged pigment particles is mixed and dispersed in the dispersion media in which each of the microcapsules 21, 22, and 23 is colored to the predetermined color as aforementioned mentioned above. The microcapsules 21, 22, and 23 are individually housed in the microcapsules. The display panel 10 of the present embodiment reproduces color by a subtractive color and mixture method and each dispersion media is respectively dyed to three types of cyan (C), magenta (M), and yellow (Y) as aforementioned above. Also, a charge pigment particles is dyed to white.

Figure 3A:
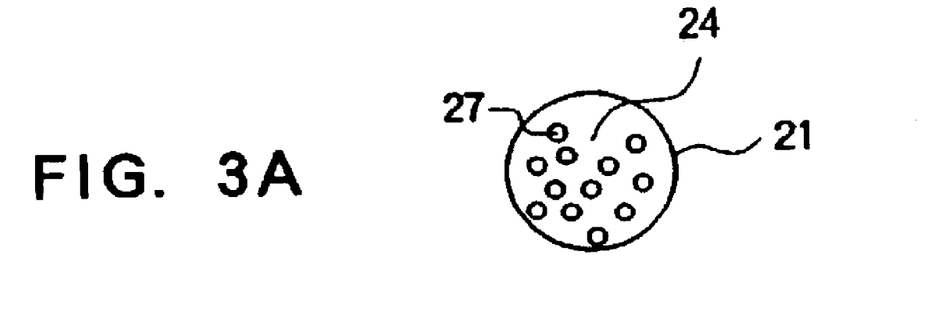
FIG. 3A is a diagram showing microcapsules including dispersion media of magenta (M)
Figure 3B:
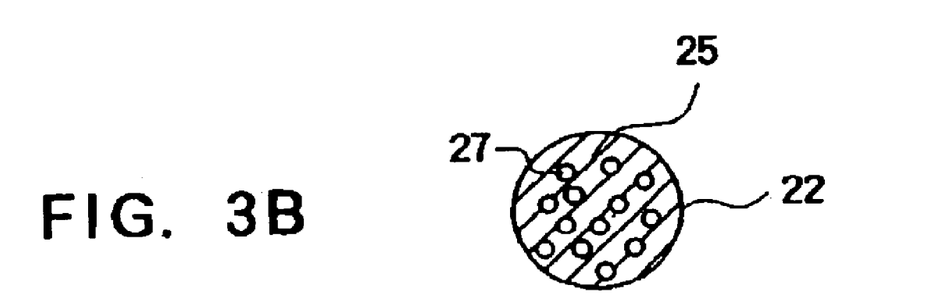
FIG. 3B is a diagram showing microcapsules including dispersion media of yellow (Y)
Figure 3C:
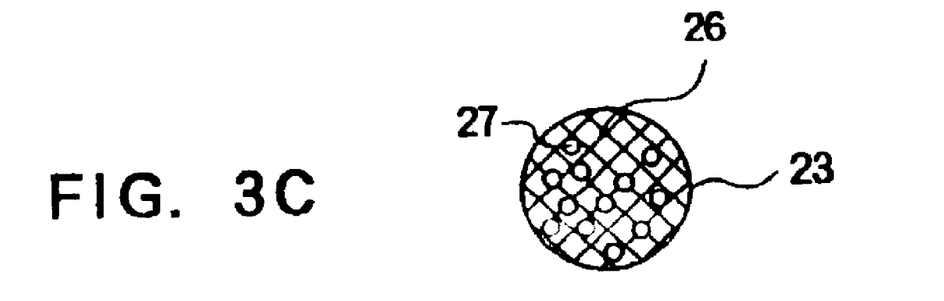
FIG. 3C is a diagram showing microcapsules including dispersion media of cyan (C)

A structure of each of the three types of microcapsules is shown in FIGS. 3A to 3C.

FIG. 3A is a diagram showing the microcapsules 21 of magenta (M) and shows a state in which a white pigment particles 27 is dispersed in dispersion media 24 dyed by magenta.

FIG. 3B is a diagram showing microcapsules 22 of yellow (Y) and shows a state in which the white pigment particles 27 is dispersed in a dispersion media 25 dyed by yellow.

Also, FIG. 3C is a diagram showing microcapsules 23 of cyan (C) and shows a state in which the white pigment particles 27 is dispersed in a dispersion media 26 dyed by cyan.

A state when the electric field from outside is being applied to such the microcapsules will be explained as an example of the microcapsules 21 of magenta referring to FIGS. 4A and 4B.

Figure 4A:
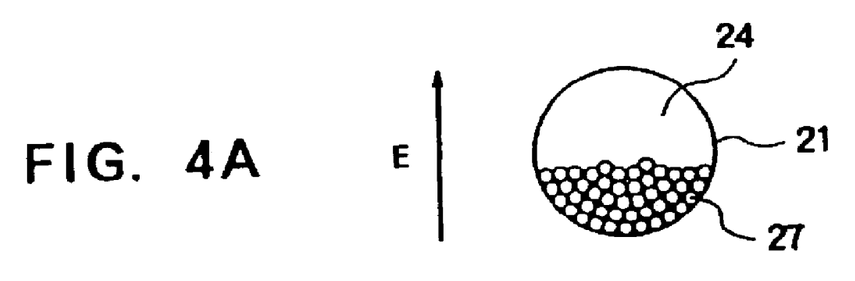
FIG. 4A is a diagram showing an inner state of the microcapsules when the electric filed is applied from the lower to the upper direction.

If it is assumed that the white pigment particles 27 is charged to negative and an electric field E is applied to the microcapsules 21 in a direction as shown in FIG. 4A, the white pigment particles 27 charged to negative migrates to the under side and the white pigment particles 27 is concentrately distributed to the lower. As a result, when the microcapsules 21 are seen from above, color of dispersion media 24 dyed by magenta, i.e. magenta is observed.

Figure 4B:
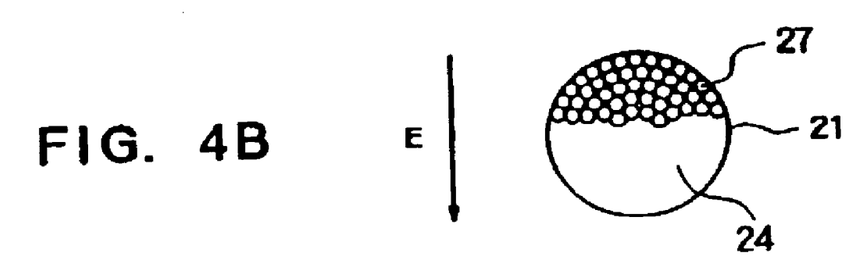
FIG. 4B is a diagram showing an inner state of the microcapsules when the electric filed is applied from the upper to the lower direction.

In contrast, if an electric field B in a direction as shown in FIG. 4B is applied to this microcapsules 21, the white pigment particles 27 migrates to the upper side and the white pigment particles 27 is concentrately distributed to the upper, thereby white is observed when this microcapsules 21 is seen from above.

As shown in the figure, the microcapsules is placed on each electrode of the first electrode 12 formed over the lower substrate 11 being divided and microcapsules layer is formed. Note that each microcapsules is fixed between the first electrode 12 and the second electrode 13 by the binder material 15 at this time.

And an electric field applied to each microcapsules is controlled by the first electrode 12 and each microcapsules provides the color of the dispersion media or white.

Also, in the display panel 10, the microcapsules 21, 22, and 23 of color being respectively magenta (M), yellow (Y), and cyan (C) are placed so as to sequentially align each two column in the column direction repeatedly as shown in FIGS. 2A and 2B. It is deemed that a display unit 20 of one pixel comprises six microcapsules 21, 22, and 23 continuing each two microcapsules of the three different types and the display panel is controlled. Thus, the display becomes possible in full color per each pixel.

The second electrode 13 is electrode which faces the first electrode 12 by a layer of the microcapsules and is formed over the upper substrate 14. In the present embodiment, the second electrode 13 is a transparent electrode formed so as to cover the whole of the microcapsules arranged two dimensionally with the same potential as shown in FIG. 2B.

The upper substrate 14 is a substrate at the display surface side of the display panel 10. The upper substrate 14 and the second electrode 13 are formed by a transparent member. Thus, a state of the microcapsules, i.e. a state of color display of a desired picture by the microcapsules, can be observed when the display panel 10 is seen from the upper substrate 14 side which is the display surface.

Next, a production method of the display panel 10 with the such structure is explained.

First, three types of dispersion media are formed by using the dispersion media of three colors—magenta, yellow, and cyan, and the white pigment particles.

Next, three types of microcapsules respectively including the three types of dispersion media are formed.

The diameters of the formed microcapsules are uniformized by any of screening or specific gravity separation method etc.

Then, three types of the microcapsules of the uniformized diameters are sequentially placed on each divisional electrode of the first electrode 12 formed over the lower substrate 11 in an arrangement shown in FIG. 2B without a gap.

The arrangement method of the microcapsules according to the present invention will be explained referring to FIGS. 5A to 5D.

Figure 5A:
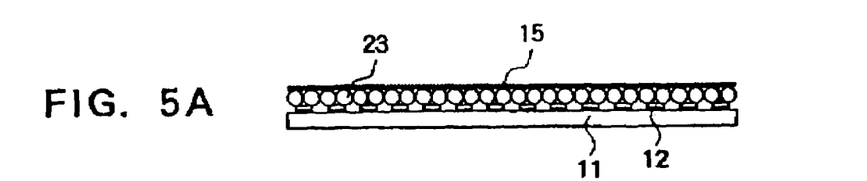
FIG. 5A is a diagram showing a state of coating the microcapsules over the substrate.

First, as shown in FIG. 5A, the microcapsules 23 each including cyan (C) dispersion media is uniformly coated onto the lower substrate 11, on which the divisional electrode 12 is formed, by using the optical hardening resin as the binder material 15.

Figure 5B:
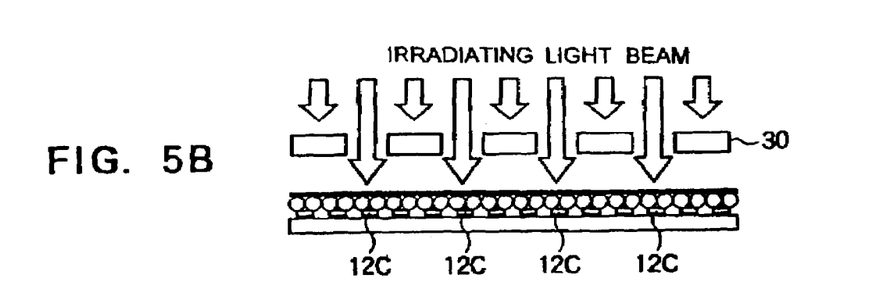
FIG. 5B is a diagram showing a step of irradiating of the light beam to the locations desired to place the microcapsules.

Next, as shown in FIG. 5B, the binder material 15 is hardened by selectively irradiating light beam to the only portions desired to place the microcapsules 23 each including cyan (C) dispersion media, i.e. the only electrodes 12c of positions where cyan color is a lit, by using the photomask 30.

The binder material 15 of the portion not hardened is removed by washing in water.

Figure 5C:
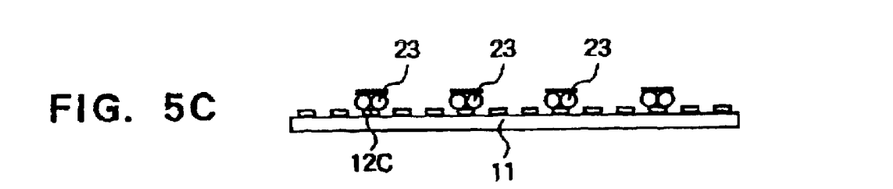
FIG. 5C is a diagram showing a state of removing the microcapsules coated at the portion not placing the microcapsules by washing in water.

As a result, the microcapsules 23 each including cyan (C) dispersion media can be selectively and accurately placed only on the display electrode 12c corresponding to cyan, as shown in FIG. 5C.

Thereafter, a similar procedure mentioned above is repeated, whereby the microcapsules 22 including yellow (Y) dispersion media, and the microcapsules 21 including magenta (M) dispersion media are sequentially placed at predetermined positions.

Namely, first, the microcapsules 22 including yellow (Y) dispersion media are coated on the portions where the microcapsules 23 including cyan (C) dispersion media have not already been placed, over the lower substrate 11, on which the divisional electrode 12 is formed, by using the optical hardening resin as the binder material 15.

Next, the binder material 15 is hardened to selectively irradiating the light beam at the only locations desired to place the microcapsules 22 including yellow (Y) dispersion media by using the photomask 30. The binder material 15 of the portions not hardened is removed by washing in water.

Finally, the microcapsules 21 including magenta (M) dispersion media are coated on the portions, where the microcapsules 23 including cyan (C) dispersion media and the microcapsules 22 including yellow (Y) dispersion media are not placed, over the lower substrate 11 on which the divisional electrode 12 is formed, by using the optical hardening resin as the binder material 15.

The binder material 15 is hardened to selectively irradiating the light beam at the only locations desired to coat the microcapsules 21 including magenta (M) dispersion media through the use of the photo ask 30.

Figure 5D:
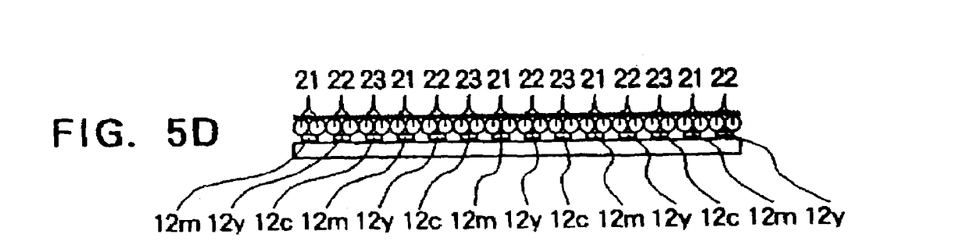
FIG. 5D is a diagram showing a state in which several types of microcapsules are finally placed over the substrate by repeating the steps of FIG. 5A to FIG. 5C.

At a result of this process, the microcapsules 21, 22, and 23 respectively including magenta (M), yellow (Y), and cyan (C) are respectively placed on divisional electrodes 12m, 12y, and 12a, corresponding to each color selectively and accurately, as shown in FIG. 5D.

Once the microcapsules 21, 22, and 23 are placed over the lower substrate 11, on which the first electrodes 12 are formed, the upper substrate 14 on which the second electrodes 13 are formed and the lower substrate 11 are bonded together, so as to sandwich the microcapsules 21, 22, and 23 therebetween.

In this way, the display panel 10 with a structure as shown in FIGS. 2A and 2B, can be produced.

As explained above, in the production method of the display panel of the present embodiment, an electrophoretic display panel capable of full color display is produced by performing a step in which the microcapsules including dispersion media of desired color are previously coated onto the whole of the substrate 11 and the microcapsules of desired color are placed at the desired position by irradiating the light beam at the portions desired to place that color's microcapsules for each color of magenta (M), yellow (Y), and cyan (C). Therefore, a high accuracy full color electrophoretic display panel can be produced, in which the microcapsules of each color is accurately placed, by a comparatively simple process without requiring a process of special accurate position control.

Note that the production method of the display panel in the present invention is not limited to the first and second embodiments as aforementioned, and various preferred modifications are available.

For instance, in the second embodiment, the production method of the display panel 10, which is capable of full color display, is described a specific panel, however, it is clear that the production method of the display panel in the present invention can be applied to a monochrome display panel.

Although the display panel of an electrophoretic system is described in the first and second embodiments as an example, a display panel of a magnetophoretic system can also be configured by a system similar to this. In that case, charged pigment particles may be changed to magnetic powder, and a voltage application means may be changed to a magnetic field application means.

Then, any means which is normally known may be used as the magnetic field application means to be comprised in the display panel. For instance, various types of magnetic heads or magnets various types may be used.

Also, three types of colors-red, green, and blue which are additional color mixture three primary colors may be used instead of the three types of colors—magenta, yellow, and cyan which are the subtractive color mixture three primary colors are used for the color of the dispersion media in the second embodiment. Also, combinations of other colors may be used.

Although the color of the charged pigment particles in white, it is preferable that the color of the charged pigment particles are black, for instance, when the additional color mixture three primary colors are used for the color of the dispersion media, and such black color may be adopted. The color of the charge pigment particles may be arbitrary determined.

Further, although the three types of microcapsules corresponding to the three primary colors are formed by changing the color of the dispersion media in the second embodiment, color of the dispersion media is identical and the three types of microcapsules corresponding to the three primary colors may be formed by changing the color of the microcapsules.

A case of a stripe arrangement in which each two columns of the same color is continuously connected in the column direction is described as an example as shown in FIG. 2B as for the two dimensional arrangement of the three types of the microcapsules of the three primary colors in the second embodiment. However, the arrangement of the three types of microcapsules is not limited to this embodiment. For instance, the microcapsules may be vertically and horizontally arranged orderly, a mosaic configuration may be applied such that directions are sequentially changed vertically and horizontally. Also, a triangle arrangement may be applied such that the microcapsules, per se, may be arranged in a zigzag manner to form a triangle arrangement.

Furthermore, the structure of one pixel may also be defined by six microcapsules being in series in one row, as in the present embodiment, or for instance, the structure of one pixel may also be defined by three microcapsules being in series in one row or an arrangement of 2×2 of a number of four microcapsules such as having number of two microcapsules of any colors and may be arbitrarily determined.

And, the areas to place the microcapsules is limited by the photomask having the shape corresponding to the electrode or magnetic poles in the production method of the display panel according to the present invention. Therefore, aligning and placing the microcapsules orderly in the first and the second embodiments as aforementioned are not necessary if the microcapsules is small enough for the electrode. It may be better to position the microcapsules to be a layer as uniform as possible and to select the microcapsules to fix by using the photomask corresponding to the shape of the electrode or the pixel. Such the method is also falls in the scope of rights of the present invention.

As explained above, the production method of the display panel, using electrophoretic or magnetophoretic, which can selectively and accurately place the microcapsules at the desired positions, can be provided according to the present invention. Thus, the production method of the display panel, using electrophoretic or magnetophoretic capable of precision display or full color display, can be provided. Further, the display panel, using electrophoretic or magnetophoretic selectively and accurately placing the microcapsules at the desired position, can be provided.

INDUSTRIAL APPLICABILITY

The production method of the display panel in the present invention can be applied to a display panel using the microcapsules housing the electrophoretic or magnetophoretic particles.

What is claimed is:

1. A display apparatus including a plurality of pixels comprising:
   a plurality of microcapsules in which a dispersion media and a plurality of particles are sealed therein; and
   a binder of optical hardening resin that binds the plurality of microcapsules to each other,
   wherein the microcapsules and the binder form a layer that is selectively placed in a region corresponding to the pixels and irradiated by light to harden the binder, and
   wherein the plurality of microcapsules provide different colors upon receiving light, and the respective microcapsules for providing the respective colors are arranged on the respective corresponding electrodes.

2. The display apparatus according to claim 1, wherein the particles include at least one of an electrophoretic or a magneticphoretic particle.

3. The display apparatus according to claim 1, wherein the dispersion media is colored.

4. The display apparatus according to claim 3, wherein the plurality of microcapsules include a plurality of groups, the dispersion media of each group is different in color.

5. The display apparatus according to claim 4, wherein the particles of each group is colored different from the color of the dispersion media.

6. The display apparatus according to claim 3, wherein the dispersion media is colored with dye(s) and/or pigment(s).

* * * * *